US012784774B2

(12) United States Patent
Shinbori et al.

(10) Patent No.: US 12,784,774 B2
(45) Date of Patent: Nov. 3, 2026

(54) MAGNETIC DISK DEVICE AND METHOD FOR CONTROLLING MAGNETIC DISK DEVICE

(71) Applicants: Kabushiki Kaisha Toshiba, Tokyo (JP); Toshiba Electronic Devices & Storage Corporation, Tokyo (JP)

(72) Inventors: Takahiro Shinbori, Yokohama Kanagawa (JP); Kazuya Nara, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/238,106

(22) Filed: Jun. 13, 2025

(65) Prior Publication Data

US 2026/0268936 A1 Sep. 10, 2026

(30) Foreign Application Priority Data

Mar. 7, 2025 (JP) ................................ 2025-036249

(51) Int. Cl.
*G11B 20/12* (2006.01)
*G11B 5/012* (2006.01)
*G11B 15/05* (2006.01)

(52) U.S. Cl.
CPC .............. *G11B 15/05* (2013.01); *G11B 5/012* (2013.01)

(58) Field of Classification Search
CPC ............. G06F 11/1076; G06F 11/1435; G11B 20/1252; G11B 2020/1238; G11B 2020/90; G11B 5/02; G11B 27/3027; G11B 27/36; G11B 5/012; G11B 5/09
USPC ........................................................... 360/48
See application file for complete search history.

(56) References Cited

U.S. PATENT DOCUMENTS

| | | | | |
|---|---|---|---|---|
| 7,304,921 | B2 | 12/2007 | Matsumoto et al. | |
| 7,502,284 | B2 | 3/2009 | Ihde | |
| 7,586,821 | B2 | 9/2009 | Sasaki | |
| 9,489,145 | B2 * | 11/2016 | Coker | G06F 3/0608 |
| 10,268,386 | B2 * | 4/2019 | Hall | G06F 12/0246 |
| 10,346,096 | B1 | 7/2019 | Naing et al. | |

* cited by examiner

*Primary Examiner* — Nabil Z Hindi
(74) *Attorney, Agent, or Firm* — Kim & Stewart LLP

(57) ABSTRACT

According to one embodiment, a magnetic disk device includes a magnetic disk and a controller. The magnetic disk includes a plurality of storage areas to which logic block addresses are respectively assigned. A set of two or more of the logic block addresses is associated with a respective one of a plurality of logic address groups. The controller is configured to cause each of the storage areas to store data in either a first recording mode or a second recording mode differing from the first recording mode, and manage, for each of the logic address groups, whether or not data write in the first recording mode has been completed for all the logic block addresses associated.

16 Claims, 10 Drawing Sheets

| UA | Data recording mode |
|---|---|
| 0 | 0 |
| 1 | 1 |
| ⋮ | ⋮ |

FIG. 5

| LAG | LBA | Write completion flag |
|---|---|---|
| 0 | 0x0 ~ 0x2000 | 1 |
| 1 | 0x2000 ~ 0x4000 | 0 |
| ⋮ | ⋮ | ⋮ |
| 2300 | 0x4600000 ~ 0x4602000 | 1 |

FIG. 6

MAGNETIC DISK DEVICE AND METHOD FOR CONTROLLING MAGNETIC DISK DEVICE

CROSS-REFERENCE TO RELATED APPLICATION(S)

This application is based upon and claims the benefit of priority from Japanese Patent Application No. 2025-036249, filed Mar. 7, 2025, the entire contents of which are incorporated herein by reference.

FIELD

Embodiments described herein relate generally to a magnetic disk device and a method for controlling a magnetic disk device.

BACKGROUND

A magnetic disk device capable of switching between data recording modes, a conventional magnetic recording (CMR) mode and a shingled write magnetic recording (SMR) mode, for each storage area is known (hereinafter, such a device may be called a "hybrid SMR device"). A hybrid SMR device in the course of the production process undergoes test operations where both the CMR mode write and the SMR mode write are conducted. On the other hand, a hybrid SMR device at the time of shipment typically has a uniform state in which the recording surface of its magnetic disk has been entirely subjected to the CMR mode write. As such, in the near-to-end phase of the production process of a hybrid SMR device, all the storage areas in the hybrid SMR device are set to the CMR mode so that medium write for the entire recording surface of the magnetic disk (hereinafter, such a write action may also be called "full data write") is conducted.

BRIEF DESCRIPTION OF THE DRAWINGS

FIG. 5 is a diagram showing exemplary area management information held by the magnetic disk device according to the embodiment.

FIG. 6 is a diagram showing exemplary write management information held by the magnetic disk device according to the embodiment.

DETAILED DESCRIPTION

In general, according to one embodiment, a magnetic disk device includes a magnetic disk and a controller. The magnetic disk includes a plurality of storage areas to which logic block addresses are respectively assigned. A set of two or more of the logic block addresses is associated with a respective one of a plurality of logic address groups. The controller is configured to cause each of the storage areas to store data in either a first recording mode or a second recording mode differing from the first recording mode, and manage, for each of the logic address groups, whether or not data write in the first recording mode has been completed for all the logic block addresses associated.

Embodiments will be described with reference to the drawings. Each embodiment will exemplify apparatuses and methods for embodying the technical idea of the invention. The drawings are schematic or conceptual and may not use dimensions, scales, etc., conforming to actual products. The technical idea of the invention is not bound by particular component shapes, structures, arrangements, etc. The description will use the same reference signs for the elements or components having the same or substantially the same functions and configurations. Numbers added to reference signs are used to distinguish elements having similar configurations.

<1> Configurations

First, configurations of a magnetic disk device 1 according to an embodiment will be described.

<1-1> Hardware Configuration of Magnetic Disk Device 1

Figure 1:
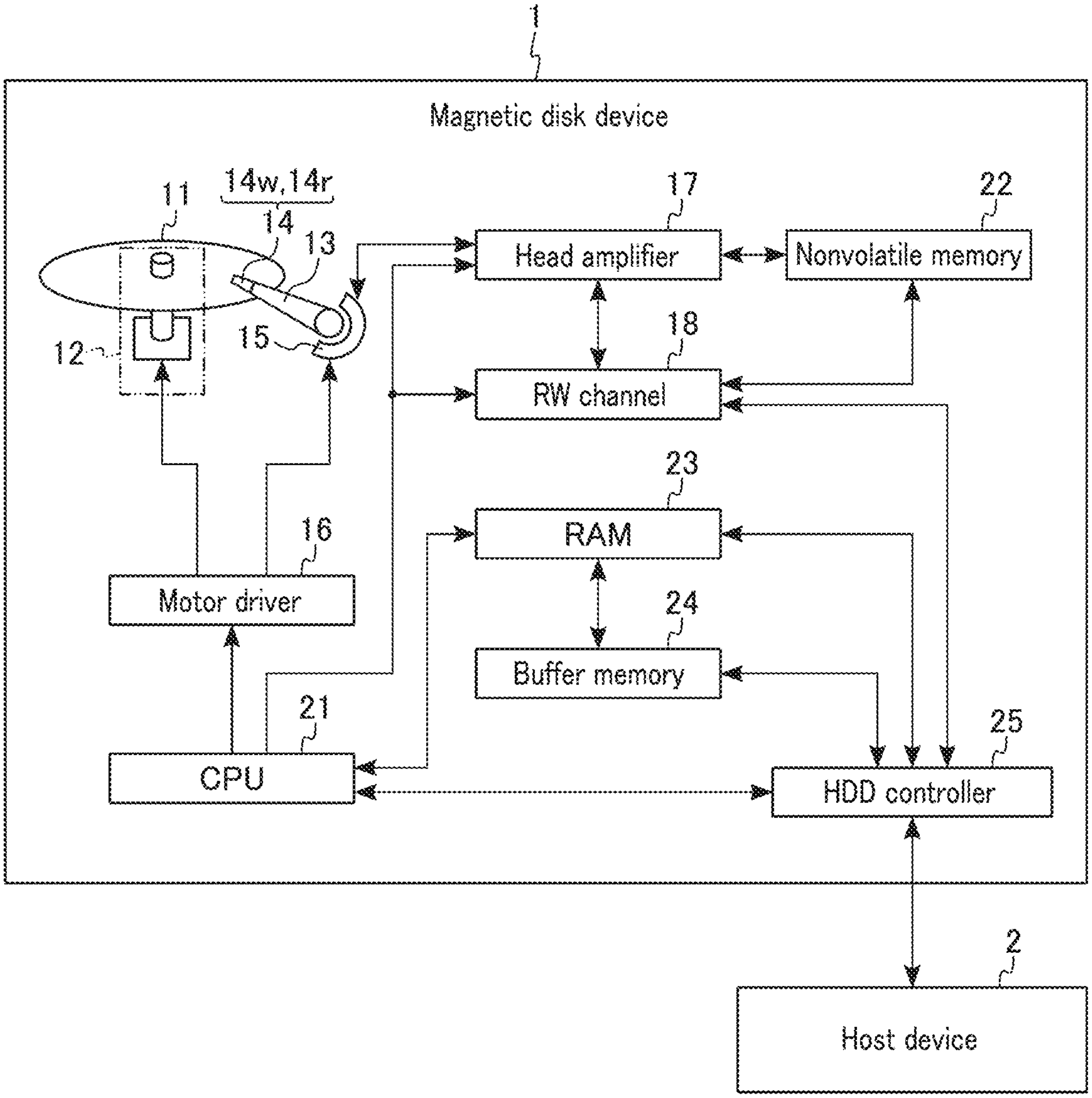
FIG. 1 is a diagram showing an exemplary hardware configuration of a magnetic disk device according to an embodiment.

FIG. 1 is a diagram showing an exemplary hardware configuration of the magnetic disk device 1 according to an embodiment. As shown in FIG. 1, the magnetic disk device 1 is configured to be connectable to a host device 2. The magnetic disk device 1 may communicate with the host device 2 according to a communication method based on a desired standard. For example, the communication methods that may be adopted for communications between the magnetic disk device 1 and the host device 2 include Serial Advanced Technology Attachment (SATA).

The magnetic disk device 1 is a memory device (storage device) for storing data by utilizing magnetization of a magnetic material. In one example, the magnetic disk device 1 is a hard disk drive (HDD) functioning as a hybrid SMR device. The magnetic disk device 1 according to the embodiment is compatible with command protocols such as the Zoned Device ATA Command Set (ZAC) and configured to execute write pointer control in either of the CMR mode and the SMR mode.

The host device 2 is a device which uses the magnetic disk device 1 as an external memory device. The host device 2 is, for example, a personal computer. The magnetic disk device 1 operates according to a command received from the host device 2. For example, based on one or more commands, the magnetic disk device 1 stores data supplied from the host device 2 and sends data stored in the magnetic disk device 1 to the host device 2.

The magnetic disk device 1 includes, in one example, components such as a magnetic disk 11, a spindle motor 12, an arm 13, a magnetic head 14, a voice coil motor 15, a motor driver 16, a head amplifier 17, a read-write (RW) channel 18, a central processing unit (CPU) 21, a nonvolatile memory 22, a random access memory (RAN) 23, a buffer memory 24, and an HDD controller 25.

The magnetic disk 11 is a disk-shaped storage medium capable of storing data in a nonvolatile manner. In one example, the magnetic disk 11 has a constitution in which a magnetic substance (magnetic material) is coated over the surface of a non-magnetic material platter. The magnetic substance-coated surface corresponds to the recording surface of the magnetic disk 11. The magnetic disk 11 may have a recording surface on one side or both sides. The magnetic disk device 1 may include two or more magnetic disks 11.

The spindle motor 12 is a device for rotating the magnetic disk 11. The spindle motor 12 includes a rotation axis and a driver. The rotation axis holds the central portion of the magnetic disk 11. The driver is adapted to drive and rotate the rotation axis. The magnetic disk 11 can be rotated about the rotation axis by the rotation of the rotation axis.

The arm 13 is a member to hold the magnetic head 14. In one example, the arm 13 has a rod shape and holds the magnetic head 14 at its distal end.

The magnetic head 14 is a component for writing data to the magnetic disk 11 and reading data from the magnetic disk 11. The magnetic head 14 contains a magnetic material. The magnetic head 14 is, with the aid of the arm 13, located at a position slightly away from the recording surface of the magnetic disk 11. The magnetic head 14 includes a write element 14*w* and a read element 14*r*.

The write element 14*w* writes write data by changing the magnetization state of a data write target area in the magnetic disk 11. The write data is data to be stored in the write target area. The write element 14*w* receives a write current and changes the magnetization of the write target area based on the write current.

The read element 14*r* generates, based on the magnetization state of the read element 14*r* and the magnetization state of a data read target area in the magnetic disk 11, a read signal which is based on data stored in the read target area.

The voice coil motor 15 is a motor for mechanically driving its driving subject based on an electric signal. The voice coil motor 15 moves the arm 13 along a radial direction of the magnetic disk 11. The radial direction of the magnetic disk 11 refers to a direction along the radius of the magnetic disk 11.

The motor driver 16 is a circuit for controlling the driving by the spindle motor 12 and the driving by the voice coil motor 15. The motor driver 16 receives an electric signal, and generates a control signal based on the received electric signal. The generated control signal contains information for controlling driving of the spindle motor 12 and information for controlling driving of the voice coil motor 15. The motor driver 16 in one example is in the form of an integrated circuit (IC) chip.

The head amplifier 17 is a circuit for executing processes for writing data to the magnetic disk 11 and processes for reading data from the magnetic disk 11. The head amplifier 17 includes a read amplifier and a write driver. The read amplifier amplifies a read signal received from the read element 14*r*. The write driver generates a write current based on a signal attributed to write data and supplies the generated write current to the write element 14*w*. In one example, the head amplifier 17 is in the form of an IC chip.

The RW channel 18 is a circuit for processing signals. The RW channel 18 receives write data from the HDD controller 25 or the buffer memory 24 and modulates the write data (or converts the write data into an analogue format) to generate the signal attributed to the write data. The RW channel 18 then supplies the generated signal to the write driver of the head amplifier 17. Also, the RW channel 18 receives the amplified read signal from the head amplifier 17 and demodulates the received read signal (or converts the received read signal into a digital format) to generate read data. The RW channel 18 then supplies the read data to the HDD controller 25 or the buffer memory 24.

The CPU 21 is an integrated circuit which takes total control over the operations of the magnetic disk device 1. The CPU 21 may control the components such as the motor driver 16 and the head amplifier 17 by running a program or programs (or firmware) loaded from the nonvolatile memory 22 to the RAM 23, so as to conduct various operations.

The nonvolatile memory 22 is a memory device for storing data in a nonvolatile manner. The nonvolatile memory 22 stores, for example, a program or programs (or firmware) and control data for realizing some of the functions of the magnetic disk device 1 and controlling the magnetic disk device 1.

The RAM 23 is a volatile memory. The RAM 23 temporarily stores data and also functions as a work area for the CPU 21. As the RAM 23, for example, a dynamic random access memory (DRAM), a static random access memory (SRAM), etc. may be employed.

The buffer memory 24 is a semiconductor memory for temporarily storing data, commands, etc., sent and received between the magnetic disk device 1 and the host device 2. As the buffer memory 24, for example, a DRAM, an SRAM, etc. may be employed. The RAM 23 may offer a part of its storage area to be used as the buffer memory 24. The buffer memory 24 stores, in one example, a command queue. The command queue outputs commands received by the magnetic disk device 1 in the order of receipt. Such commands may include a write command and a read command. The write command specifies, by a start address and a size, an area in the magnetic disk 11 to which data is to be written. The magnetic disk device 1 sends data stored in the magnetic disk device 1 to the host device 2 based on the read command. The read command specifies, by a head address and a size, an area in the magnetic disk 11 from which data is to be read. The commands stored in the command queue are unprocessed (or unexecuted) commands, and they may be hereinafter each called an "unprocessed command".

The HDD controller 25 is an interface which controls transmission and reception of signals between the magnetic disk device 1 and the host device 2. The HDD controller 25 includes a terminal (or a connector) for connection with wiring that enables communications with the circuits and the host device 2. The HDD controller 25 supplies write data received from the host device 2 to the buffer memory 24 and/or the RAM 23. The HDD controller 25 receives read data from the buffer memory 24 and/or the RAM 23 and sends the read data to the host device 2. The HDD controller 25 supplies a command received from the host device 2 to the buffer memory 24. Some of the functions of the HDD controller 25 may be realized by the CPU 21 running the program or programs loaded into the RAM 23.

<1-2> Configuration of Magnetic Disk 11

A configuration of the magnetic disk 11 will be described.

Figure 2:
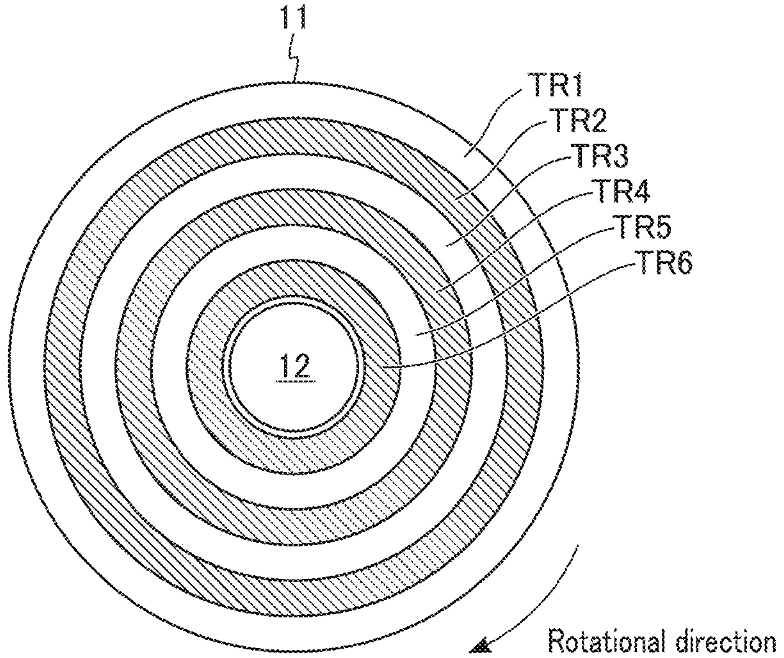
FIG. 2 is a plan view showing exemplary areas of a magnetic disk in the magnetic disk device according to the embodiment.

FIG. 2 is a plan view showing exemplary areas of the magnetic disk 11 in the magnetic disk device 1 according to the embodiment. As shown in FIG. 2, the magnetic disk 11 includes multiple tracks TRs on its recording surface. The tracks TRs are circles differing in radii from one another. The tracks TRs share a common center which corresponds to the rotation axis of the spindle motor 12. In one example, the magnetic disk 11 rotates in the clockwise direction, i.e., one of the two directions along the circumference of the magnetic disk 11. As the magnetic disk 11 rotates, the magnetic head 14 moves relative to the magnetic disk 11. The direction in which the magnetic disk 11 rotates may be called a "rotational direction". In the present example, the magnetic disk 11 includes 6 tracks TR1, TR2, TR3, TR4, TR5, and TR6 in order from the largest radius. Note that the number of tracks TRs in the magnetic disk 11 may be discretionarily set.

Figure 3:
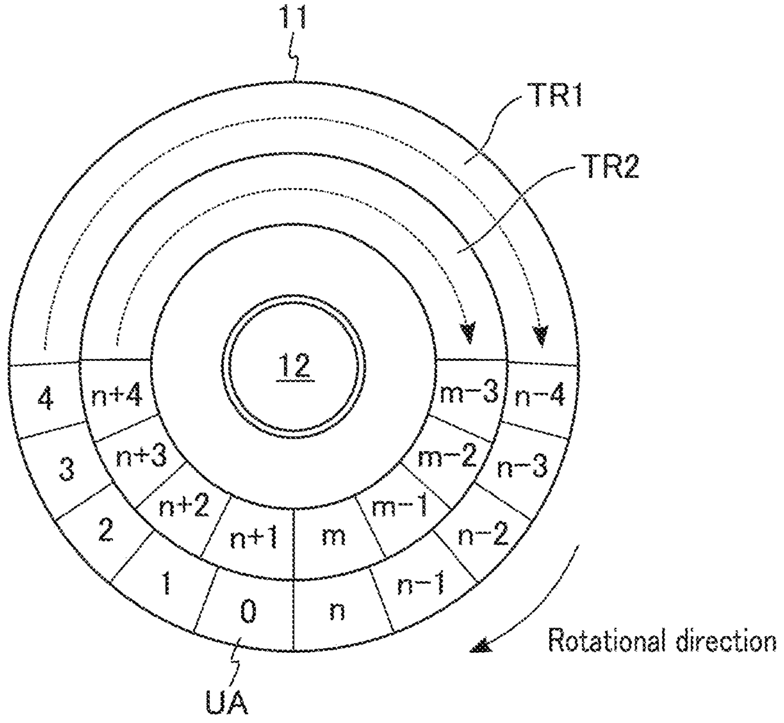
FIG. 3 is a plan view showing exemplary addresses assigned to the areas of the magnetic disk in the magnetic disk device according to the embodiment.

FIG. 3 is a plan view showing exemplary addresses assigned to the areas of the magnetic disk 11 in the magnetic disk device 1 according to the embodiment. As shown in FIG. 3, each track TR is divided into multiple unit areas UAs. The unit areas UAs are storage areas which are, under the same data storage mode, capable of storing data of the same size. The unit area UA includes, for example, one or more sectors. The unit area UA may also be called a "zone". Each unit area UA is assigned a unique logical block address (LBA). In one example, LBAs are assigned in ascending order to the respective unit areas UAs arranged in the rotational direction in each track TR. More specifically, to the unit areas UAs arranged in the rotational direction in the track TR1, respective addresses ranging from 0 to n (n being a positive integer) are assigned in ascending order. To each of the unit areas UAs arranged in the rotational direction in the track TR2, respective addresses ranging from n+1 to m (m being a positive integer greater than n+1) are assigned in ascending order. Unique addresses are likewise assigned to the unit areas UAs in the other tracks TRs as in the unit areas UAs in the tracks TR1 and TR2.

The magnetic disk device 1 allows a user to designate the CMR mode or the SMR mode to be the data storage mode for each unit area UA. In other words, in the magnetic disk device 1, the same medium surface of the magnetic disk 11 may be utilized for both the CMR mode data storage and the SMR mode data storage. A track per inch (TPI) in the case of adopting the SMR mode for the unit area UA differs from that in the case of adopting the CMR mode for the unit area UA. Also, a zone boundary in the CMR mode and a zone boundary in the SMR mode are not aligned with each other. The unit area UA for which the SMR mode is adopted entails partial overlap of the adjacent tracks, and thus, requires medium data write in a sequential manner. On the other hand, the unit area UA for which the CMR mode is adopted does not require sequential medium data write. In an instance where the write pointer for the unit area UA under the designation of the CMR mode indicates "full" (in an instance where all of the logic block addresses LBAs in a given zone or zones have already been subjected to a write action), the magnetic disk device 1 may access desired LBAs to perform random write, read, etc., in the same way as a magnetic disk device designed for the CMR mode.

<1-3> Functional Configuration of Magnetic Disk Device 1

Figure 4:
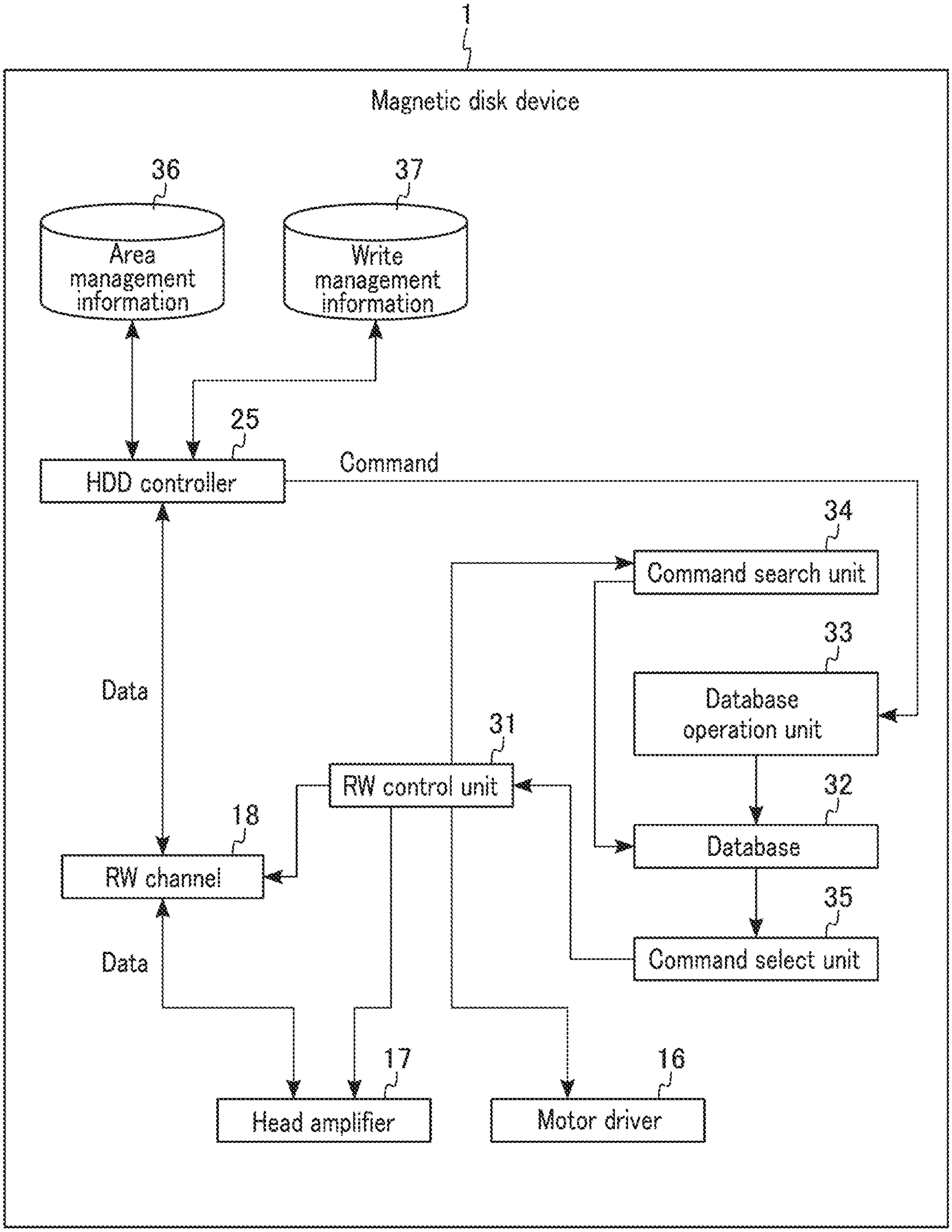
FIG. 4 is a diagram showing an exemplary functional configuration of the magnetic disk device according to the embodiment.

FIG. 4 is a block diagram showing an exemplary functional configuration of the magnetic disk device 1 according to the embodiment. As shown in FIG. 4, the magnetic disk device 1 in one example includes an RW control unit 31, a database 32, a database operation unit 33, a command search unit 34, a command select unit 35, area management information 36, and write management information 37. The database operation unit 33, the command search unit 34, and the command select unit 35 are each realized by the CPU 21 running the program or programs loaded into the RAM 23.

The RW control unit 31 is a functional block which generally controls data read and write in the magnetic disk device 1. The RW control unit 31 controls the motor driver 16, the head amplifier 17, and the RW channel 18 based on a read command or a write command. The RW channel 18 inputs and outputs data between the HDD controller 25 and the head amplifier 17 under the control of the RW control unit 31.

The database 32 includes management data for managing unprocessed commands in the command queue. The database 32 may be realized by a storage space of the RAM 23 and its backup may be secured in the nonvolatile memory 22.

The database operation unit 33 is a functional block which operates and updates the database based on entry and removal of commands done by the HDD controller 25 in the command queue. The database operation unit 33, according to the entry of an unprocessed command into the command queue, adds data related to the added unprocessed command to the database 32. The database operation unit 33, according to the removal of an unprocessed command from the command queue upon execution of the same, deletes data related to the removed command from the database 32.

The command search unit 34 is a functional block which searches for an unprocessed command that satisfies a condition, using the database 32. The command search unit 34 receives a command select request from the RW control unit 31. The command select request asks for selection of an unprocessed command based on a given condition. The command search unit 34 causes the command queue to output, as a candidate command, an unprocessed command that has been found based on the specified condition.

The command select unit 35 is a functional block which selects a command to be executed next to the command currently being executed. Hereinafter, such a command to be executed next to the currently executed command may be called a "next command". The command select unit 35 receives the candidate command. The command select unit 35 compares the candidate command with a currently available next command and selects the newest next command based on the comparison result. The newest next command is received by the RW control unit 31. The RW control unit 31, once it becomes capable of executing a new unprocessed command, executes the currently available next command.

The area management information 36 is managed and referred to by the HDD controller 25 and keeps information for managing the data recording mode set for each unit area UA. The area management information 36 may be realized by a storage space of the RAM 23 and its backup may be secured in the nonvolatile memory 22. FIG. 5 is a table showing one example of the area management information 36 held by the magnetic disk device 1 according to the embodiment. As shown in FIG. 5, the area management information 36 keeps information on the data recording mode for each unit area UA. In the present example, "0" in the column for the data recording mode indicates that the CMR mode is adopted for the corresponding unit area UA. If "1" is put into the column for the data recording mode, it is indicated that the SMR mode is adopted for the corresponding unit area UA.

The write management information 37 is managed and referred to by the HDD controller 25 and includes a write completion flag for each logic address group LAG. Each logic address group LAG is a group of multiple logic block addresses LBAs. A logic address group LAG is associated with multiple logic block addresses LBAs. Such multiple logic block addresses LBAs associated with a logic address group LAG constitute a portion corresponding to, for example, one track TR. The write completion flag is information indicative of whether or not the medium data write in the CMR mode has been performed for all the logic block addresses LBAs associated with the corresponding logic address group LAG in the magnetic disk device 1 after a test process (which will be described later). The write management information 37 may be realized by a storage space of the RAM 23 and its backup may be secured in the nonvolatile memory 22.

FIG. 6 is a table showing one example of the write management information 37 held by the magnetic disk device 1 according to the embodiment. FIG. 6 illustrates an example where the logic block addresses LBAs in the CMR mode are grouped into logic address groups LAGs in a unit of 4 MiB (0×2000 sectors). As shown in FIG. 6, the write management information 37 keeps information on the logic block addresses LBAs and information on the write completion flag for each logic address group LAG.

More specifically, and for example, the write management information 37 keeps logic block addresses LBAs (0×0 to 0×2000) and a write completion flag “1” in association with a logic address group LAG0, logic block addresses LBAs (0×2000 to 0×4000) and a write completion flag “0” in association with a logic address group LAG1, and logic block addresses LBAs (0×4600000 to 0×4602000) and a write completion flag “1” in association with a logic address group LAG2300.

In one example, the write completion flag with a value “1” indicates that the medium data write in the CMR mode has been performed for each of the logic block addresses LBAs in the corresponding logic address group LAG. The write completion flag with a value “0” indicates that the medium data write in the CMR mode has not been performed for each of the logic block addresses LBAs in the corresponding logic address group LAG. The number of the logic address groups LAGs is variable according to the storage capacity of the magnetic disk 11 and the number of the associated logic block addresses LBAs. The write management information 37 is not limited to particular contents as long as it enables confirmation of whether or not write has been performed for each of the groups (the logic address groups LAGs) of the logic block addresses LBAs.

<2> Production Process

Figure 7:
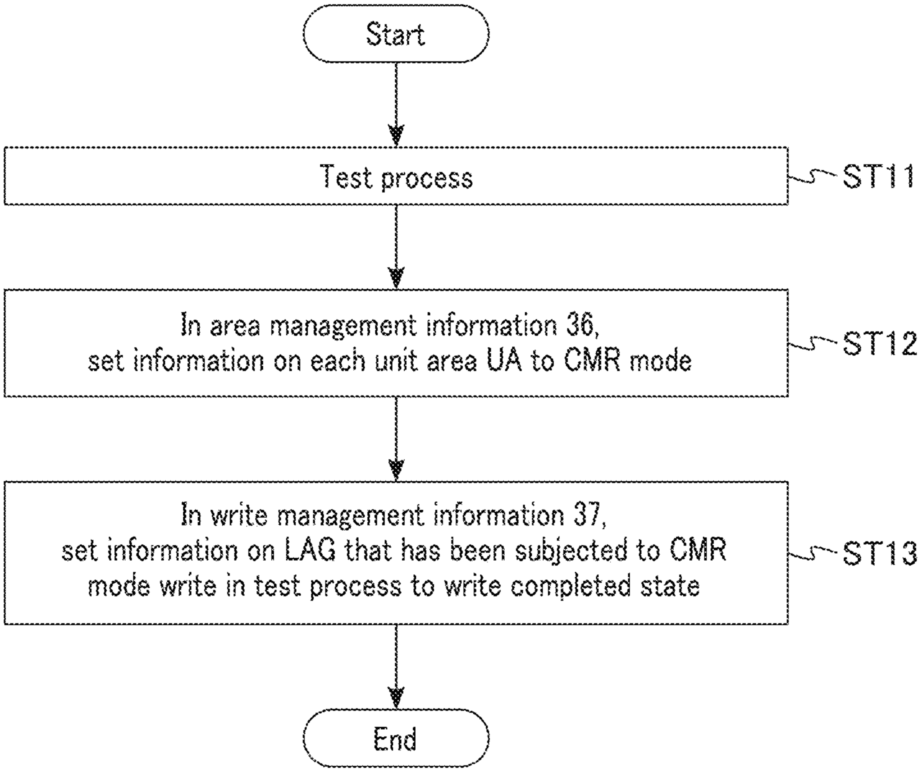
FIG. 7 is a flowchart showing an exemplary process for producing the magnetic disk device according to the embodiment.

FIG. 7 is a flowchart showing an exemplary process for producing the magnetic disk device 1 according to the embodiment. In one example of the process for producing the magnetic disk device 1 according to the embodiment, a series of processing steps shown in FIG. 7 is initiated upon completion of the assembly of the magnetic disk device 1 (“Start”). The process shown in FIG. 7 is carried out by a testing device connected to the magnetic disk device 1. This testing device for the magnetic disk device 1 may be a computer of the host device 2, etc.

First, a test process for the magnetic disk device 1 is carried out (step ST11). In the test process, medium data write and medium data read that adopt the CMR mode and medium data write and medium data read that adopt the SMR mode are performed using a given unit area or areas UAs.

Through this, the magnetic disk 11 is tested to check whether or not the CMR mode data recording and the SMR mode data recording are both available.

Next, information on each unit area UA in the area management information 36 is set to the CMR mode (step ST12). The process of step ST12 is carried out by, for example, the testing device accessing the area management information 36 stored in the nonvolatile memory 22. Note that the process of step ST12 may instead be carried out in such a manner that the testing device generates area management information 36 and instructs the magnetic disk device 1 to store the generated area management information 36 in the nonvolatile memory 22.

Next, in the write management information 37, information on the logic address group LAG that has been subjected to the CMR mode write in the test process is set to a write completed state (step ST13). The process of step ST13 is carried out by, for example, the testing device accessing the write management information 37 stored in the nonvolatile memory 22. Note that the process of step ST13 may instead be carried out in such a manner that the testing device generates write management information 37 based on the result of the test process and instructs the magnetic disk device 1 to store the generated write management information 37 in the nonvolatile memory 22. The process of step ST13 may be carried out by the magnetic disk device 1 in accordance with the progress of step ST11. Upon completion of the process of step ST13, the series of processing steps shown in FIG. 7 comes to the end (“End”).

<3> Operations

Operations of the magnetic disk device 1 will be described as a method for controlling the magnetic disk device according to the embodiment. The below described operations of the magnetic disk device 1 are realized by the HDD controller 25 controlling each component or configuration of the magnetic disk device 1.

<3-1> Write Operation

Figure 8:
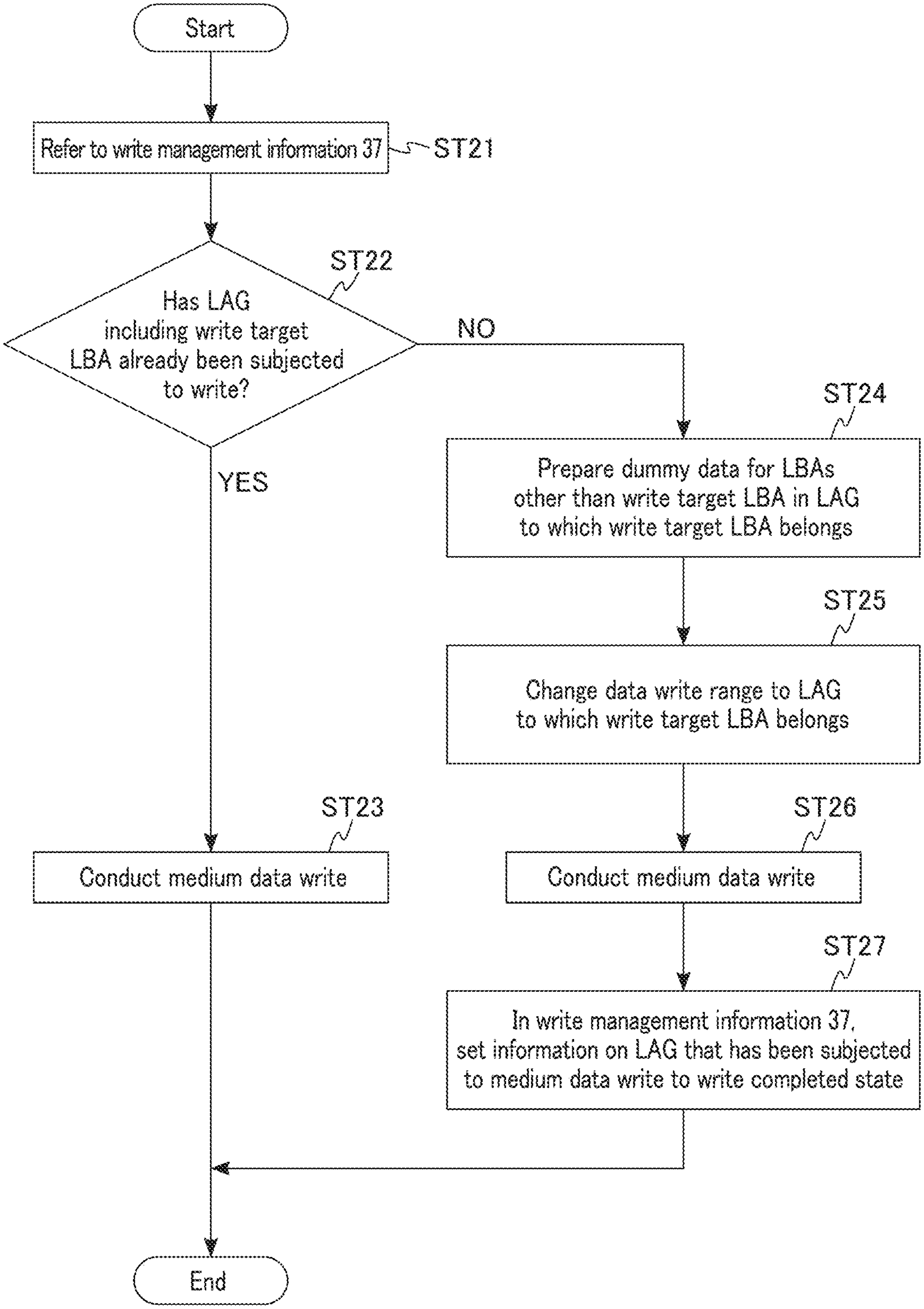
FIG. 8 is a flowchart showing an exemplary write operation of the magnetic disk device according to the embodiment.

FIG. 8 is a flowchart showing an exemplary write operation of the magnetic disk device 1 according to the embodiment. The magnetic disk device 1, in response to receiving write data, a logic block address LBA of a write target, and a write command from the host device 2, starts a series of processing steps shown in FIG. 8 (“Start”).

First, the magnetic disk device 1 refers to the write management information 37 (step ST21). The magnetic disk device 1 thus checks whether or not the logic address group LAG that includes the write target logic block address LBA has already been subjected to write (step ST22).

If the logic address group LAG that includes the write target logic block address LBA has already been subjected to write (step ST22: “YES”), the magnetic disk device 1 conducts medium data write (step ST23). In the medium data write in step ST23, the magnetic disk device 1 causes the unit area UA corresponding to the write target logic block address LBA to store the write data received from the host device 2. Upon completion of the medium data write, the magnetic disk device 1 terminates the series of processing steps shown in FIG. 8 (“End”).

If the logic address group LAG that includes the write target logic block address LBA has not been subjected to write yet (step ST22: “NO”), the magnetic disk device 1 prepares dummy data for the logic block addresses LBAs other than the write target logic block address LBA in the logic address group LAG to which the write target logic block address LBA belongs (step ST24). Any data may be used as the dummy data. The magnetic disk device 1 then changes the data write range to the logic address group LAG to which the write target logic block address LBA belongs (step ST25). The magnetic disk device 1 then conducts medium data write (step ST26). In the medium data write in step ST26, the magnetic disk device 1 causes the unit area UA corresponding to the write target logic block address LBA to store the write data received from the host device 2 and causes each of the unit areas UAs corresponding to the non-write target logic block addresses LBAs to store the dummy data, in the logic address group LAG to which the write target logic block address LBA belongs. Upon completion of the medium data write, the magnetic disk device 1 sets, in the write management information 37, information on the logic address group LAG that has been subjected to the medium data write to a write completed state (step ST27). The magnetic disk device 1 then terminates the series of processing steps shown in FIG. 8 ("End").

Figure 9:
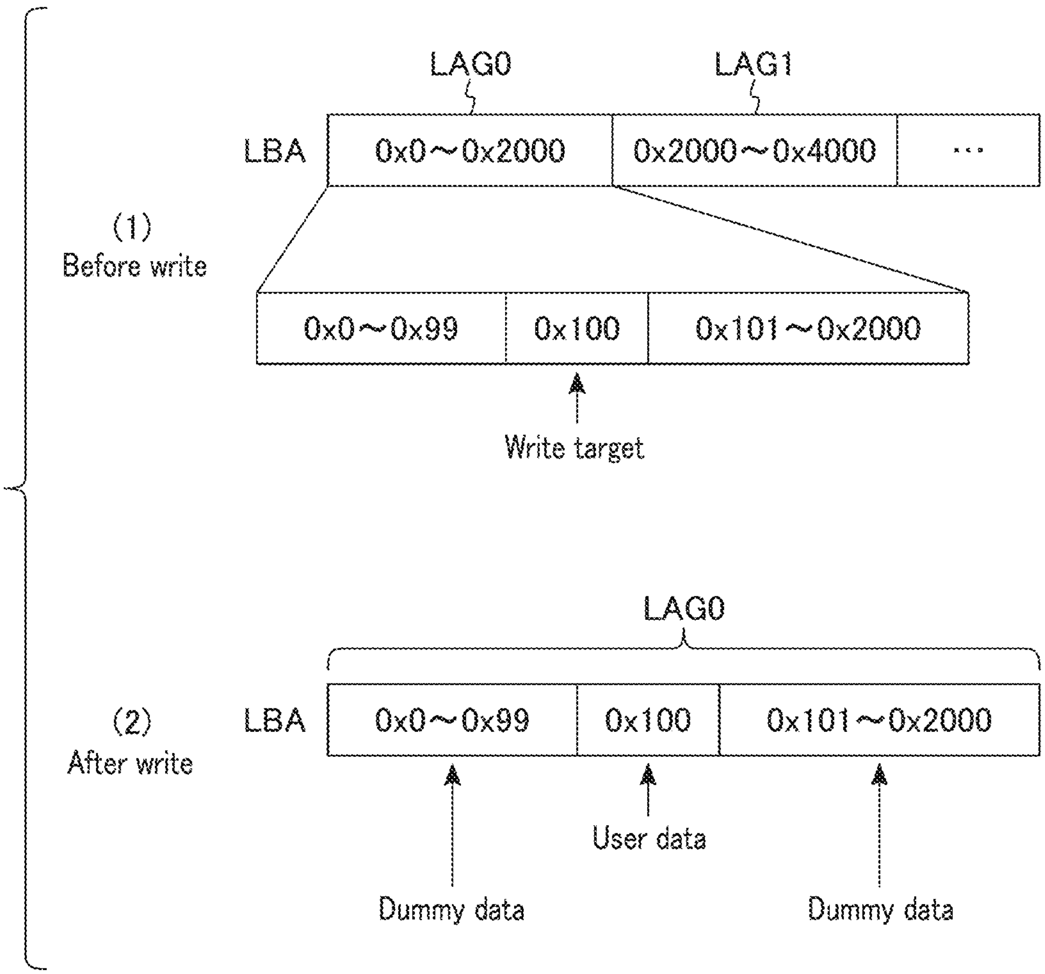
FIG. 9 is a diagram showing exemplary changes in data stored in a group of logic addresses before and after the write operation of the magnetic disk device according to the embodiment.

FIG. 9 is a diagram showing exemplary changes in data stored in the logic address group LAG before and after the write operation of the magnetic disk device 1 according to the embodiment. FIG. 9 (1) shows a state of the logic block addresses LBAs before write. FIG. 9 (2) shows a state of the logic block addresses LBAs after write. This example assumes that a write operation for a logic block address LBA 0×100, i.e., a one-sector write, is performed in a state where the write management information 37 indicates that the logic address group LAG0 has not been subjected to write yet. In more concrete terms, the logic block address LBA 0×100 included in the logic address group LAG0 is now selected as a write target as shown in FIG. 9 (1). Upon performing the write operation, the logic address group LAG0 turns to a state where user data (write data received from the host device 2) is stored in the logic block address LBA 0×100 and dummy data is stored in the logic block addresses LBAs 0×0 to 0×99 and 0×101 to 0×2000 as shown in FIG. 9 (2).

<3-2> Read Operation

Figure 10:
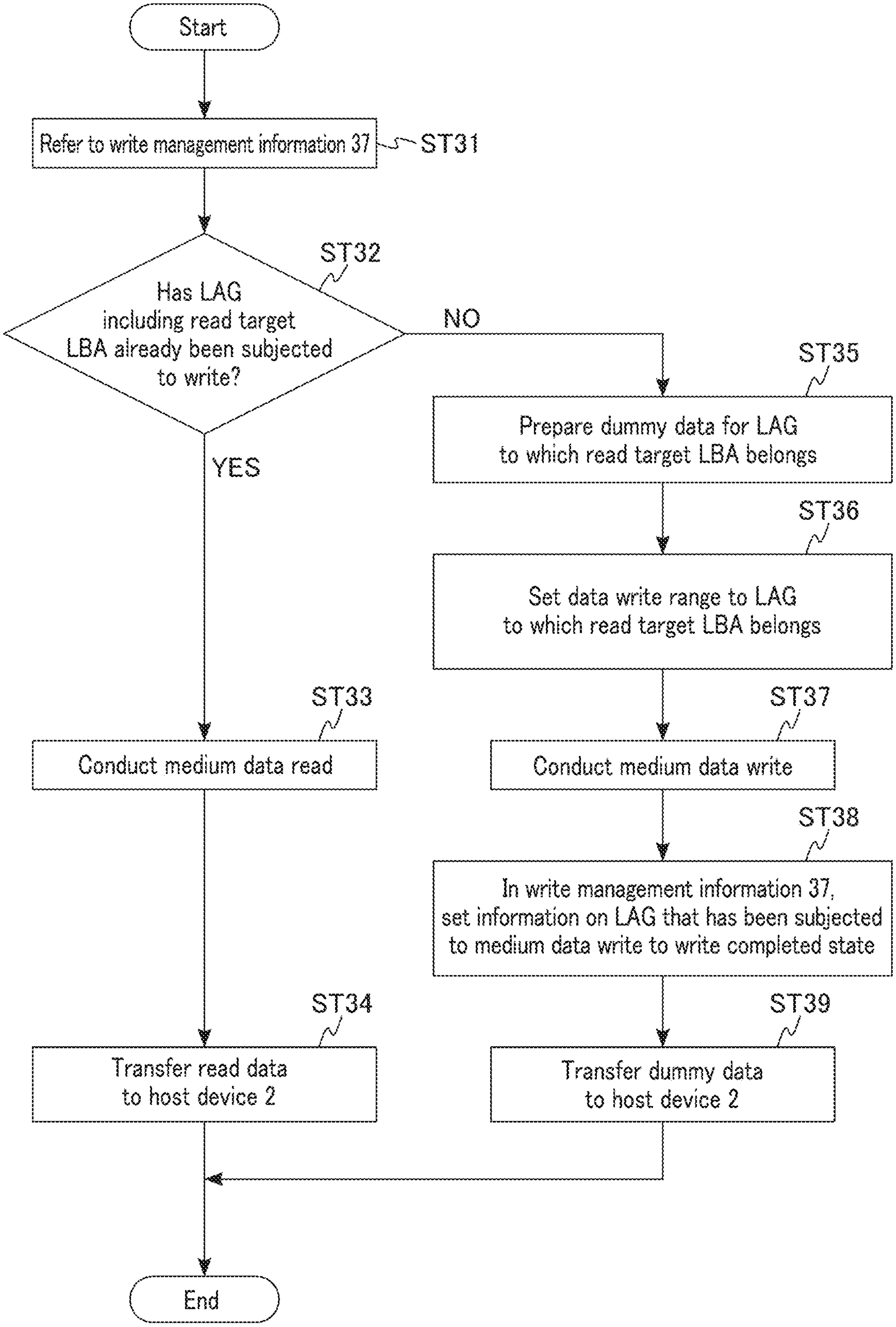
FIG. 10 is a flowchart showing an exemplary read operation of the magnetic disk device according to the embodiment.

FIG. 10 is a flowchart showing an exemplary read operation of the magnetic disk device 1 according to the embodiment. The magnetic disk device 1, in response to receiving a logic block address LBA of a read target and a read command from the host device 2, starts a series of processing steps shown in FIG. 10 ("Start").

First, the magnetic disk device 1 refers to the write management information 37 (step ST31). The magnetic disk device 1 thus checks whether or not the logic address group LAG that includes the read target logic block address LBA has already been subjected to write (step ST32).

If the logic address group LAG that includes the read target logic block address LBA has already been subjected to write (step ST32: "YES"), the magnetic disk device 1 conducts medium data read (step ST33). In the medium data read in step ST33, the magnetic disk device 1 obtains read data from the unit area UA corresponding to the read target logic block address LBA received from the host device 2. The magnetic disk device 1 then transfers the read data to the host device 2 (step ST34). Upon completion of the transfer of the read data, the magnetic disk device 1 terminates the series of processing steps shown in FIG. 10 ("End").

If the logic address group LAG that includes the read target logic block address LBA has not been subjected to write yet (step ST32: "NO"), the magnetic disk device 1 prepares dummy data for the logic address group LAG to which the read target logic block address LBA belongs (step ST35). Here, any data may be used as the dummy data. The magnetic disk device 1 then sets the data write range to the logic address group LAG to which the read target logic block address LBA belongs (step ST36). The magnetic disk device 1 then conducts medium data write (step ST37). In the medium data write in step ST37, the magnetic disk device 1 causes each of the unit areas UAs for the read target logic address group LAG to store the dummy data. Upon completion of the medium data write, the magnetic disk device 1 sets, in the write management information 37, information on the logic address group LAG that has been subjected to the medium data write to a write completed state (step ST38). Subsequently, the magnetic disk device 1 transfers the dummy data to the host device 2 without conducting medium data read (step ST39). The dummy data transferred in step ST39 corresponds to the dummy data assigned to the read target logic block address LBA. Upon completion of the transfer of the dummy data, the magnetic disk device 1 terminates the series of processing steps shown in FIG. 10 ("End").

Figure 11:
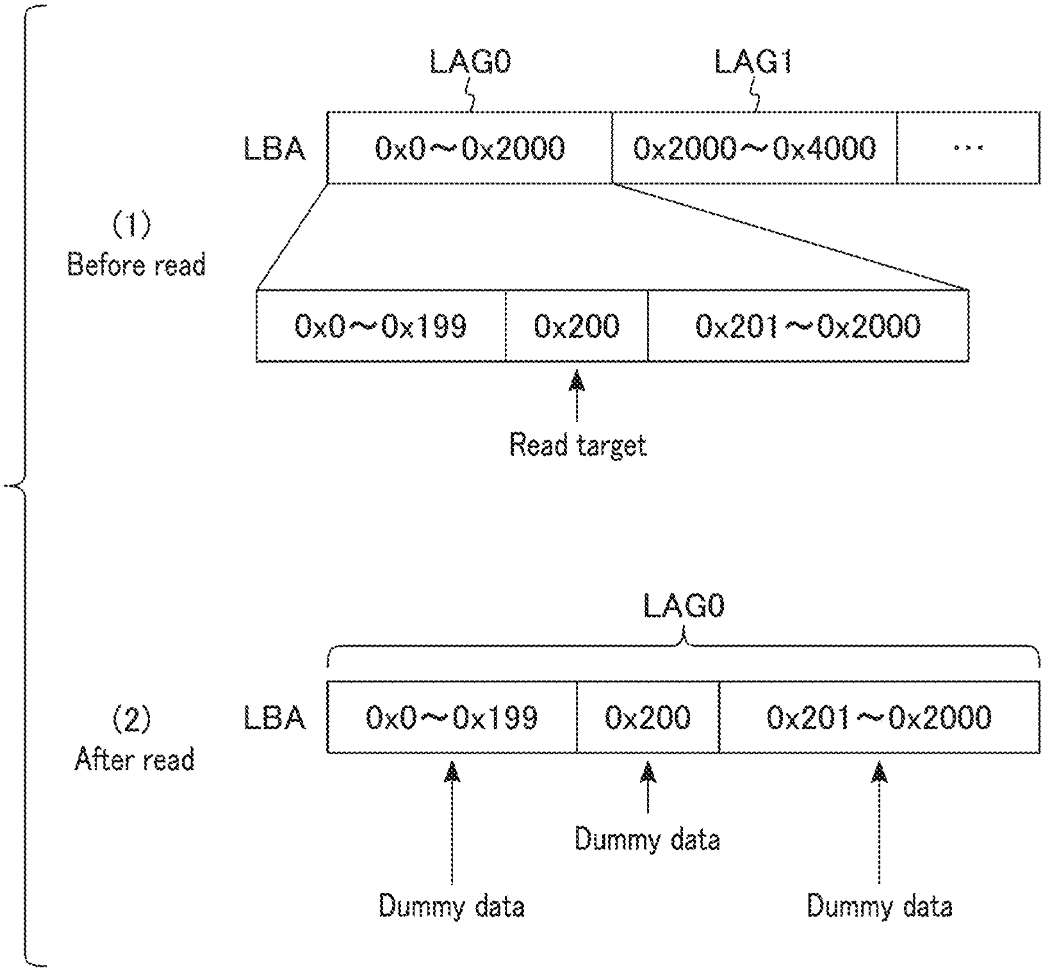
FIG. 11 is a diagram showing exemplary changes in data stored in a group of LBAs before and after the read operation of the magnetic disk device according to the embodiment.

FIG. 11 is a diagram showing exemplary changes in data stored in the logic addresses group LAG before and after the read operation of the magnetic disk device 1 according to the embodiment. FIG. 11 (1) shows a state of the logic block addresses LBAs before read. FIG. 11 (2) shows a state of the logic block addresses LBAs after read. This example assumes that a read operation for a logic block address LBA 0×200, i.e., a one-sector read, is performed in a state where the write management information 37 indicates that the logic address group LAG0 has not been subjected to write yet. In more concrete terms, the logic block address LBA 0×200 included in the logic address group LAG0 is now selected as a read target as shown in FIG. 11 (1). Upon performing the read operation, the logic address group LAG0, due to the medium data write in step ST37, turns to a state where the dummy data is stored in all of its logic block address LBAs including the read target logic block address LBA 0×200 as shown in FIG. 11 (2).

<3-3> Modifications, Etc.

Figure 12:
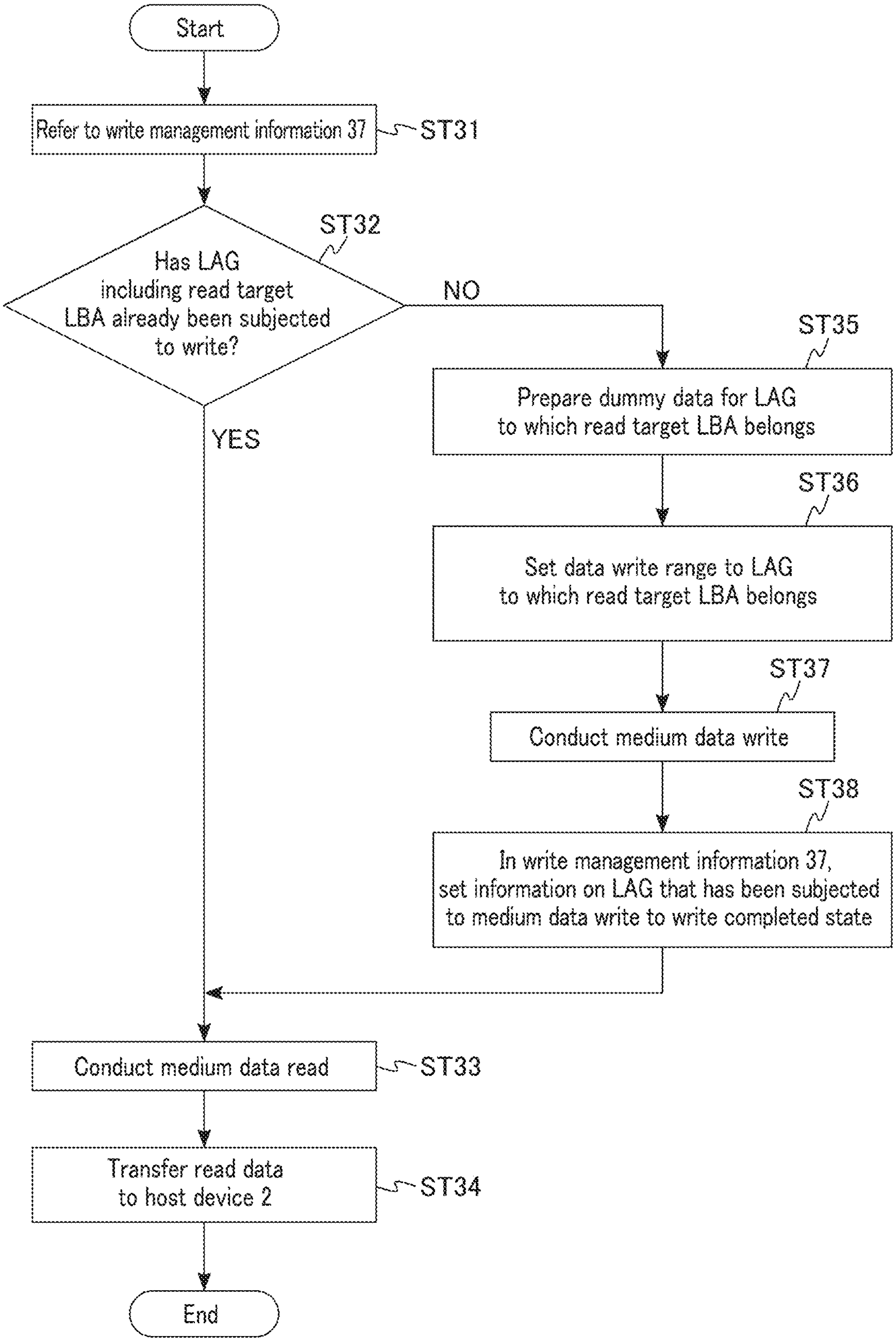
FIG. 12 is a flowchart showing a modification of the write operation of the magnetic disk device according to the embodiment.

FIG. 12 is a flowchart showing a modification of the write operation of the magnetic disk device 1 according to the embodiment. The flowchart shown in FIG. 12 represents a configuration where the flowchart shown in FIG. 10 is modified so that the processing of step ST33 is carried out after the processing of step ST38. The magnetic disk device 1 may in this manner conduct the medium data read in the case where the logic address group LAG that includes a read target logic block address LBA has not been subjected to write yet.

The write operation and the read operation in the foregoing description are carried on until at least the medium data write for all the logic address groups LAGs (that is, all the LBA units under management) is complete after the shipment of the magnetic disk device 1. The state where all the logic address groups LAGs have been subjected to write is as good as the state where the full data write has been conducted. As such, the magnetic disk device 1 may adopt a configuration in which, upon confirming that all the logic address groups LAGs have been subjected to write, the write operation directly proceeds to the medium data write in step ST23 by omitting the processing steps ST21 and ST22 and the read operation directly proceeds to the medium data read in step ST33 by omitting the processing steps ST31 and ST32.

In an instance where the data recording mode is switched from the CMR mode to the SMR mode for the unit area UA related to the logic address group LAG that is not indicated to be in the write competed state in the write management information 37, the magnetic disk device 1 according to the embodiment may exclude the corresponding logic block address LBA from the management with the write management information 37. In other words, the HDD controller 25 may adopt a configuration in which, if the data recording mode for a given storage area is changed from the CMR mode to the SMR mode, the HDD controller 25 excludes the logic block address LBA corresponding to this storage area from the management of whether or not the CMR mode data write has been completed. In this manner, the magnetic disk device 1 continues the management of write completed states in the units of one track or a given number of logic block addresses LBAs until the CMR mode medium data write is complete or the SMR mode is adopted for the management subject logic block addresses LBAs.

<4> Advantageous Effects of Embodiments

Advantageous effects of the embodiments will be described.

Memory capacity of a magnetic disk has been increasing in recent years and the time required for full data write after test processes is becoming longer. Such a prolonged full data write time after test processes could incur a decline in productivity of hybrid SMR devices. If, in this relation, a process equivalent to the CMR mode full data write is possible in the user environment after the shipment of a hybrid SMR device, improved productivity can be expected from the shortened production process time.

In this view, the magnetic disk device 1 according to one or more embodiments manages, in units of multiple logic block addresses LBAs, whether or not the CMR mode write has been completed in order to realize the operational condition where the full data write has been completed, without conducting a full data write. The magnetic disk device 1 then conducts, each time a read operation or a write operation is performed in the user environment, the medium data write for the logic address group LAG that includes an operation target logic block address LBA.

This allows the user to access the entire recording surface of the magnetic disk device 1 from immediately after the shipment, even if the magnetic disk device 1 has not undergone the full data write. The magnetic disk device 1 according to one or more embodiments can advance the process corresponding to the full data write little by little in the user environment after the shipment of the magnetic disk device 1. As a result, the magnetic disk device 1 according to one or more embodiments can realize a shortened production time with the omission of full data write before the shipment, and can consequently reduce the production costs of the magnetic disk device 1.

Note that, although the medium data write for a non-operation target logic block address LBA is conducted until the full data write in the user environment is complete, deterioration of read and write performance is suppressed according to sizes of logic address groups LAGs. For example, the time required to complete the medium data write and the medium data read for one track TR does not largely differ from the time required to complete the medium data write and the medium data read for logic block addresses LBAs that are less than one track TR. As such, the magnetic disk device 1 can carry out the process equivalent to the full data write in the user environment while suppressing the performance deterioration. With the magnetic disk device 1, a balance between performance deterioration that could occur due to the full data write and the time until completion of the full data write in the user environment can be adjusted according to sizes of the logic address groups LAGs.

<5> Others

In the magnetic disk device 1 according to one or more embodiments, one or a set of some or all of the HDD controller 25, the RW control unit 31, the database operation unit 33, the command search unit 34, and the command select unit 35 may be regarded as a control unit or a controller. The magnetic disk device 1 has functions which are, in operation, implemented by the functional blocks shown in FIG. 4. Each functional block in the embodiments is not required to be defined or specified as shown in FIG. 4. Some of the functions may be implemented by functional blocks different from the illustrated functional blocks, and they may be further divided into smaller functional sub-blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:

a magnetic disk including a plurality of storage areas to which logic block addresses are respectively assigned, a set of two or more of the logic block addresses being associated with a respective one of a plurality of logic address groups; and a controller configured to cause each of the storage areas to store data in either a first recording mode or a second recording mode differing from the first recording mode, and manage, for each of the logic address groups, whether or not data write in the first recording mode has been completed for all the logic block addresses associated with the respective logic address group.

2. The magnetic disk device according to claim 1, wherein the logic address groups include a first logic address group, the first logic address group includes a first logic block address, and the controller is further configured to conduct a write operation of user data for the first logic block address in such a manner that, if the data write in the first recording mode has not been completed for the first logic address group, the controller causes the first logic block address to store the user data and causes a remaining logic block address or addresses other than the first logic block address in the first logic address group to store dummy data.

3. The magnetic disk device according to claim 1, wherein the logic address groups include a second logic address group, the second logic address group includes a second logic block address, and the controller is further configured to conduct a read operation for the second logic block address in such a manner that, if the data write in the first recording mode has not been completed for the second logic address group, the controller causes all of the logic block addresses associated with the second logic address group to store dummy data, and causes the dummy data to be output as a result of the read operation.

4. The magnetic disk device according to claim 1, wherein the storage areas include a first storage area, and the controller is further configured to exclude, if a data recording mode for the first storage area is changed from the first recording mode to the second recording mode, the logic block address corresponding to the first storage area from management of whether or not the data write in the first recording mode has been completed.

5. The magnetic disk device according to claim 1, wherein the magnetic disk includes a plurality of tracks differing in radii from one another, and each of the logic address groups is constituted by the logic block addresses for one track.

6. The magnetic disk device according to claim 1, wherein the first recording mode is a conventional magnetic recording (CMR) mode, and the second recording mode is a shingled write magnetic recording (SMR) mode.

7. A method for controlling a magnetic disk device, the magnetic disk device comprising a magnetic disk including a plurality of storage areas to which logic block addresses are respectively assigned, a set of two or more of the logic block addresses being associated with a respective one of a plurality of logic address groups, the method comprising:

causing each of the storage areas to store data in either a first recording mode or a second recording mode differing from the first recording mode, and managing, for each of the logic address groups, whether or not data write in the first recording mode has been completed for all the logic block addresses associated with the respective logic address group.

8. The method according to claim 7, wherein the logic address groups include a first logic address group, the first logic address group includes a first logic block address, and the method further comprises conducting a write operation of user data for the first logic block address in such a manner that, if the data write in the first recording mode has not been completed for the first logic address group, the first logic block address is caused to store the user data and a remaining logic block address or addresses other than the first logic block address in the first logic address group are caused to store dummy data.

9. The method according to claim 7, wherein the logic address groups include a second logic address group, the second logic address group includes a second logic block address, and the method further comprises conducting a read operation for the second logic block address in such a manner that, if the data write in the first recording mode has not been completed for the second logic address group, all of the logic block addresses associated with the second logic address group are caused to store dummy data, and the dummy data is output as a result of the read operation.

10. The method according to claim 7, wherein the storage areas include a first storage area, and the method further comprises excluding, if a data recording mode for the first storage area is changed from the first recording mode to the second recording mode, the logic block address corresponding to the first storage area from management of whether or not the data write in the first recording mode has been completed.

11. The method according to claim 7, wherein the magnetic disk includes a plurality of tracks differing in radii from one another, and each of the logic address groups is constituted by the logic block addresses for one track.

12. The method according to claim 7, wherein the first recording mode is a conventional magnetic recording (CMR) mode, and the second recording mode is a shingled write magnetic recording (SMR) mode.

13. The magnetic disk device according to claim 1, wherein the controller is configured to manage whether or not the data write has been completed by utilizing a specific write completion flag assigned to each of the plurality of logic address groups, the write completion flag holding a state indicating either a write completed state or a write uncompleted state for the corresponding logic address group.

14. The magnetic disk device according to claim 2, wherein the controller is configured to change, in response to storing the dummy data in the remaining logic block address or addresses, a state of the corresponding logic address group to a write completed state.

15. The method according to claim 7, wherein the managing whether or not the data write has been completed includes tracking a specific write completion flag assigned to each of the plurality of logic address groups, the write completion flag holding a state indicating either a write completed state or a write uncompleted state for the corresponding logic address group.

16. The method according to claim 8, further comprising:

changing, in response to storing the dummy data in the remaining logic block address or addresses, a state of the corresponding logic address group to a write completed state.

* * * * *